(12) United States Patent
Barber

(10) Patent No.: US 7,748,623 B2
(45) Date of Patent: Jul. 6, 2010

(54) CONTAINER SCREENER

(75) Inventor: Jeffrey B. Barber, Vineland, NJ (US)

(73) Assignee: Battelle Memorial Institute, Columbus, OH (US)

( * ) Notice: Subject to any disclaimer, the term of this patent is extended or adjusted under 35 U.S.C. 154(b) by 196 days.

(21) Appl. No.: 11/983,556

(22) Filed: Nov. 8, 2007

(65) Prior Publication Data
US 2008/0116267 A1 May 22, 2008

Related U.S. Application Data

(60) Provisional application No. 60/857,885, filed on Nov. 8, 2006.

(51) Int. Cl.
G06K 15/00 (2006.01)
G06F 17/00 (2006.01)
G06F 19/00 (2006.01)

(52) U.S. Cl. ................... 235/383; 235/375; 235/385

(58) Field of Classification Search .............. 235/375, 235/383, 385, 462.01
See application file for complete search history.

(56) References Cited

U.S. PATENT DOCUMENTS

| 4,234,844 A | 11/1980 | Yukl |
| 4,563,739 A | 1/1986 | Gerpheide et al. |
| 4,975,968 A | 12/1990 | Yukl |
| 5,041,789 A | 8/1991 | Keller et al. |
| 5,446,271 A | 8/1995 | Cherry et al. |
| 5,907,633 A | 5/1999 | Fromenteau et al. |
| 6,480,141 B1 | 11/2002 | Toth et al. |
| 6,784,854 B1 | 8/2004 | Yukl |
| 6,837,428 B2 * | 1/2005 | Lee et al. ............... 235/383 |
| 6,952,163 B2 | 10/2005 | Huey et al. |
| 6,975,968 B2 | 12/2005 | Nakamitsu et al. |
| 7,046,761 B2 | 5/2006 | Ellenbogen et al. |
| 7,070,097 B2 | 7/2006 | Blanford et al. |
| 7,184,990 B2 * | 2/2007 | Walker et al. ........... 705/400 |
| 7,246,522 B1 | 7/2007 | Diaz et al. |
| 7,372,366 B2 * | 5/2008 | Lyon et al. ............ 340/572.8 |
| 7,389,918 B2 * | 6/2008 | Wike et al. .............. 235/383 |
| 7,487,109 B2 * | 2/2009 | Taylor et al. ............. 705/21 |
| 7,489,246 B2 * | 2/2009 | Himberger et al. ...... 340/572.1 |
| 2005/0073310 A1 | 4/2005 | Weatherall et al. |
| 2007/0040682 A1 * | 2/2007 | Zhu et al. ............. 340/572.1 |
| 2008/0044096 A1 * | 2/2008 | Cowburn et al. ......... 382/238 |

* cited by examiner

Primary Examiner—Thien M. Le
Assistant Examiner—April A Taylor
(74) Attorney, Agent, or Firm—Diederiks & Whitelaw, PLC

(57) ABSTRACT

A container screener apparatus that uses container barcode (e.g. Universal Product Code) scanning, and one or more container and/or container content property measurements (e.g. photograph, description, weighing, acoustic measurement), and container comparison data stored in a database to determine if a container passes or fails a container screening based on predetermined pass/fail criteria.

13 Claims, 4 Drawing Sheets

CONTAINER SCREENER

This application claims the benefits of U.S. Provisional Application No. 60/857,885, Container Screener, filed Nov. 8, 2006. The contents of the provisional application are incorporated herein by reference.

This invention was made with government support under Contract No. DTFACT-03-C-00042 awarded by the Federal Aviation Administration. The Government has certain rights in this invention.

FIELD OF THE INVENTION

The container screener according to the invention provides for provides a reliable way to determine if a container fits predetermined criteria for the container. The container screener is useful in identifying containers whose criteria have changed and alerting users such as security screeners, port officials, law enforcement personnel and the like. Typically a UPC code (Universal Product Code) is associated with a container. A database of key data such as container weight, spectra and the like allows effects of container size, shape, and material to be removed as it would be contained in the reference data base. The system would then provide a tighter tolerance on go/no go identification.

BACKGROUND OF THE INVENTION

Currently container screeners do not use the product UPC to aid in identification of a container and in determining if the container meets predetermined criteria for the container. Use of the barcode will simplify analysis and remove complicating factors such as container shape, size, and material. Use of a barcode can increase throughput of a container screener in allowing the user to simply scan the barcode and the container and will not require making a determination of container contents.

Typical related art illustrating measurement of various materials, objects, containers and the like include:
US 2005/0073310; U.S. Pat. Nos. 7,246,522; 7,070,097; 6,952,163; 6,784,854; 6,480,141; 5,907,633; 5,446,271; 5,041,789; 4,975,968; 4,563,739; and U.S. Pat. No. 4,234,844.

BRIEF DESCRIPTION OF THE INVENTION

Broadly, the invention combines technologies for barcode (Universal Product Code) scanning, measurement of container property properties (e.g. weight, acoustic, electromagnetic, thermal, and other predetermined properties) together with database comparison. A barcode scanner allows for the rapid identification of reference properties of commercially available containers entered into a database. The container is typically and without limitation a bottle, a jar, a can, a box and the like. The container materials are typically and without limitation plastic, glass, paper, cardboard, foil, and a composite of materials. The database typically includes product data such as (without limitation) a description, picture or photograph, one or more physical properties such as weight, one or more spectral properties, one or more acoustic properties, one more magnetic properties, among others. A typical container may contain a liquid, solid, gas, or combinations and mixtures thereof. Use of screening technology by security personnel is simplified since a container's shape, size and contents are identified automatically and the user is not required to search and determine the makeup of the real item's contents. Contact measurement would also not be necessary as a reference. Measuring properties of the container at the checkpoint would add an additional criterion to prevent contraband from being smuggled through. The invention does not determine the contents of the container rather the invention determines if predetermined criteria of the container are different from those expected. Typically the container measured data will agree within a set amount of variation with the stored data that is associated with the bar code. Typically, if the data measured for the container varies from the stored data by a predetermined amount, the container is rejected or seized. Since container contents do not need to be determined, it is expected that effectiveness of detecting products that have been altered will increase.

Another broad embodiment of the invention provides for an apparatus for screening a container including (1) a container screener that includes a UPC code scanner for scanning a UPC code on a container; and a measurement unit for measuring at least one parameter of the container; (2) a database for storing container parameter data related to the UPC code; and a computer for retrieving the stored data in the database in response to the scanned UPC code from the UPC scanner and for comparing the stored data with the measured data. Typically, an indicator is used for indicating to a user whether a container passes or fails the container screening in response to a signal from comparison of data in the computer. Parameters of the container include data measured for a particular container and data stored for a particular container.

A yet further embodiment according to another aspect of the invention is an apparatus for screening a container including a bar code scanner for scanning a bar code on the container; a measurement unit for measuring at least one pre-selected parameter associated with the container; a database for storing at least one pre-selected parameter data for the container; and a computer operationally connected to the bar code scanner, measurement unit, and database, wherein the computer retrieves data from scanner, measurement unit and database and compares the pre-selected data from the measurement unit and database. Typically an indicator is operationally connected to the computer for indicating to a user the result of the computer comparison. Preferably two or more measured and two or more stored parameters are compared so that reliability of the determination is increased.

Another embodiment of the invention provides for a method for screening a container by the steps of scanning a bar code on the container; measuring at least one pre-selected parameter associated with the container; retrieving from a database at least one stored pre-selected parameter for the container that is equivalent to the measured parameter for the container, and that is associated with the scanned bar code; and comparing the at least one pre-selected parameter from the container measurement and the equivalent parameter stored in the database. Typically the method indicates to a user if the comparison in is within selected limits. Further, in one embodiment at least two pre-selected measured parameters and at least two stored equivalent parameters are compared. In yet another embodiment, at least three pre-selected measured parameters and at least three stored equivalent parameters are compared. A higher number of parameters typically increases the reliability of the pass-fail determination. Typical useful measured and stored parameters include bar code information, weight, temperature, acoustic properties, electromagnetic properties, and dimensional properties where when more than one is measured any plural combination of the above is useful in various embodiments according to the invention.

DETAILED DESCRIPTION OF THE INVENTION AND BEST MODE

Figure 1:
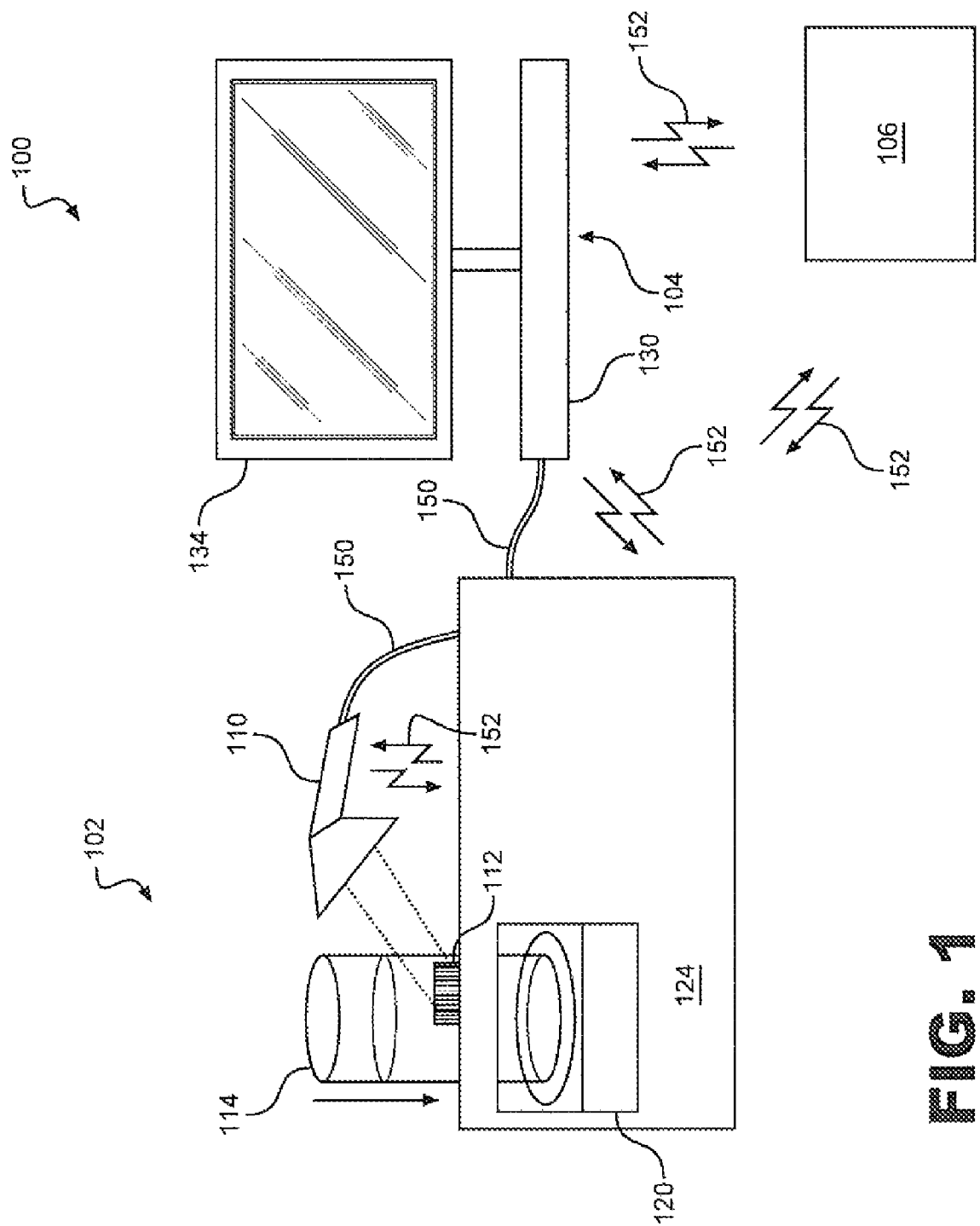
FIG. 1 is a schematic drawing of a typical container screening apparatus according to one aspect of the invention.

The ability to screen containers at security checkpoints is of growing interest in light of recent world events. The need to allow travelers and visitors to bring sealed containers through security requires the ability to determine if the contents of a container contain prohibited material without opening the container. This situation applies to the aviation sector as well as event security for concert venues and stadiums. For this reason, container screeners have been developed for use at checkpoints.

One type of container screener is based upon electromagnetic methods. Each material has a fundamental property known as its relative dielectric constant, $\in_r$. The material of interest is placed in an oscillating electric field and the magnitude and shift of the frequency are measured to calculate the dielectric constant. Another type of container screener is based upon acoustic methods. This method utilizes ultrasonic pulses within a container to determine both velocity and attenuation of the pulses in the liquid. The measurement of these properties of material is commonplace today and can be done easily using modern electronics and computers for data processing.

Every material has it own electromagnetic/acoustic properties. This includes both pure substances and mixtures. This makes identification of mixtures in real-world samples extremely difficult. Additionally, the shape and material of a container may effect the measurement, making it even more difficult to accurately determine the properties of the material inside. There is also a desire to rapidly increase any database that contains reference data on materials of interest that are brought through security checkpoints by travelers. Currently, no container screener presents a robust method to remove container effects from the measurement, utilizes additional properties, such as weight and/or other properties, as an additional criterion for evaluating containers, and allows for rapidly increasing the size of the database.

The present invention provides a simple and cost-effective method for increasing the effectiveness of using a container screener for security applications. With the use of a barcode scanner and a scale, these variables are eliminated by correlating the spectrum of a specific container and its specific contents to a barcode that is specific to that product and its manufactures weight in container. Additionally, rather than having to perform a contact measurement on a material of interest, a material can be scanned quickly in container and added to a database that correlates the data with the unique product UPC.

Hardware

In one embodiment, aside from the container screener, additional hardware that is necessary typically consists of commercial off-the-shelf components. In a first embodiment, these components include a barcode scanner, a scale and computer hardware. Due to the deployed nature of such a device at a checkpoint, the capability to wirelessly network devices to one another and to a central database is desirable. Traditional wired networking capability can be used.

Software and Database Capabilities

The software will be able to communicate with the database to retrieve the spectrum of the material of interest via the unique UPC for that item. Using standard software techniques for pattern recognition, the sample spectrum is then compared to the reference spectrum for a confidence check. The software preferably has an easy to use graphical interface. The local database is typically stored on a secure server locally. The server preferably can communicate to a central database at regular intervals to update stored data and ensure integrity of data. Due to the minimal size of the data file for each individual product (estimated at no more than a few kB per item), only modest storage capabilities will be necessary.

To add materials to the database, the device is preferably capable of collecting data and storing it on the computer. In this mode, the scanner itself would make a reference measurement on the container of interest. No contact measurement with the material inside the container is necessary as the fundamental properties of the material that should be in the container are known based on the UPC code used with the container. In some embodiments the properties of the entire container, packaging and contents, are of interest. Reference measurements can therefore be conducted at any location without the user interacting with potential hazardous substances.

Operation of the System

The system is typically operated in a simple Pass/Fail mode. At a security checkpoint a screener can quickly examine a container to ensure that any seal such as a safety seal is intact. This may negate the need to do further tests since the lack of an intact seal shows failure and the need to confiscate and possibly further evaluate the container elsewhere for explosives, toxins, or contraband.

After the seal is confirmed to be intact, the UPC code is typically scanned by the system and the container placed into a measurement chamber so that a measurement can be made. A computer with appropriate software will then look up the data from the barcode and compare the measured data (for example spectral data and weight data with a stored spectrum and weight for the container being tested). The stored data is typically derived from an identical product that has been added to the database under controlled circumstances.

Upon comparing the parameters such as spectra and weight of these containers, a simple Pass/Fail indication can be given to the screener. Actions taken could include refusal of entry of the person with the container or confiscation of the container for further analysis/investigation.

Referring now to FIG. 1, the figure illustrates an overall system for screening containers 100. The system 100 further includes a container screener 102 that is in communication with a local computer 104, and/or a remote computer/database 106. Local computer 104 may also have the capability to communicate with remote computer/database 106 that may have access to a central database from which it is updated on a regular basis. A local database may be stored in container screener 102, and/or computer 104. A remote database is typically stored in computer/database 106. A UPC bar code reader 110 in communication with software/data in container screener 124 scans a UPC code 112 located on a container 114 that is placed on or in bottle screener 102. Additional data collected by one or more measurements that can be made by one or more measurement devices 120 that can obtain measured data such as weight, spectral information, acoustic information, magnetic information and so on for container 114. Communication between the various parts of the system 100 may be by electrical wiring 150 or by wireless communication 152.

Figure 2:
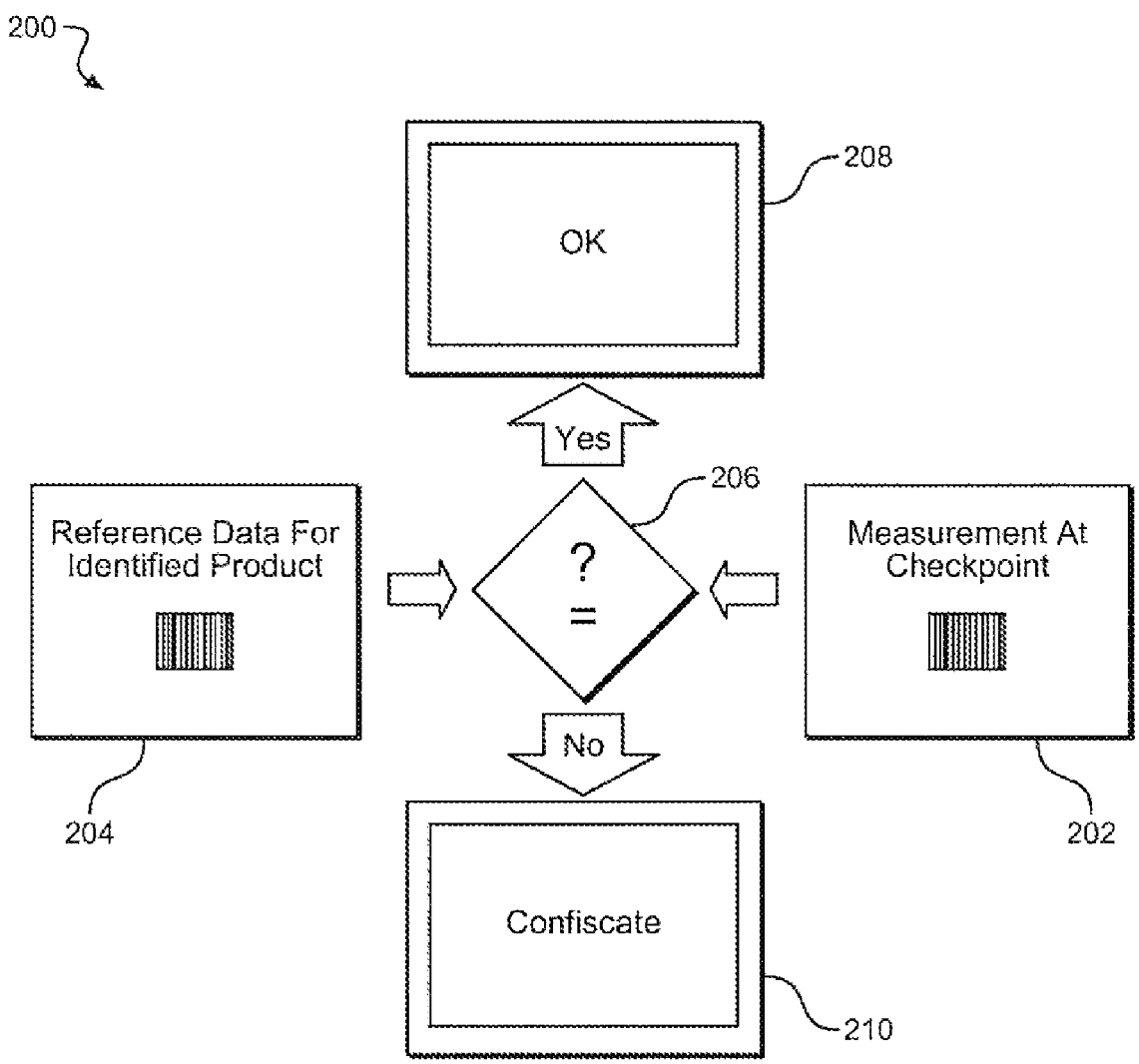
FIG. 2 is a schematic drawing showing a typical logic diagram for determining passing or failure of a test for container screening at a security checkpoint.

Referring now to FIG. 2, this figure illustrates a typical logic sequence 200 for deciding if a container passes inspection or is confiscated. One or more measurements 202 for one or more parameters associated with a container including the UPC code are made by the container screening system 100. Reference data 204 of stored parameters for the scanned UPC code is obtained. Comparison 206 of the measured data parameters 202 and reference data parameters 204 is made. If the comparison is the same or within predetermined limits that indicate that the container or its contents have not been altered or adulterated, then a YES determination 208 is made and the container passes the inspection. If the comparison is not the same or is outside predetermined limits that indicate alteration, or adulteration then the container fails and is rejected or confiscated 210. Typically if a measured parameter from a screened container is within 20% of the value of the equivalent parameter from the database then the container passes the screening test for that parameter, more preferably if a measured parameter from a screened container is within 10% of the value of the equivalent parameter from the database then the container passes the screening test for that parameter, and most preferably if a measured parameter from a screened container is within 5% of the value of the equivalent parameter from the database then the container passes the screening test for that parameter. As will be appreciated by those skilled in the art, manufacturing tolerances, measuring tolerances and other factors will influence the deviation allowed for measured parameters. In some embodiments the pass/fail determination will be made in terms of one or more standard deviations. Evaluating two (e.g. weight, spectral response), or more preferably three (e.g. weight, spectral response, acoustic tests), measured parameters will increase the confidence level for rejection or acceptance.

Figure 3:
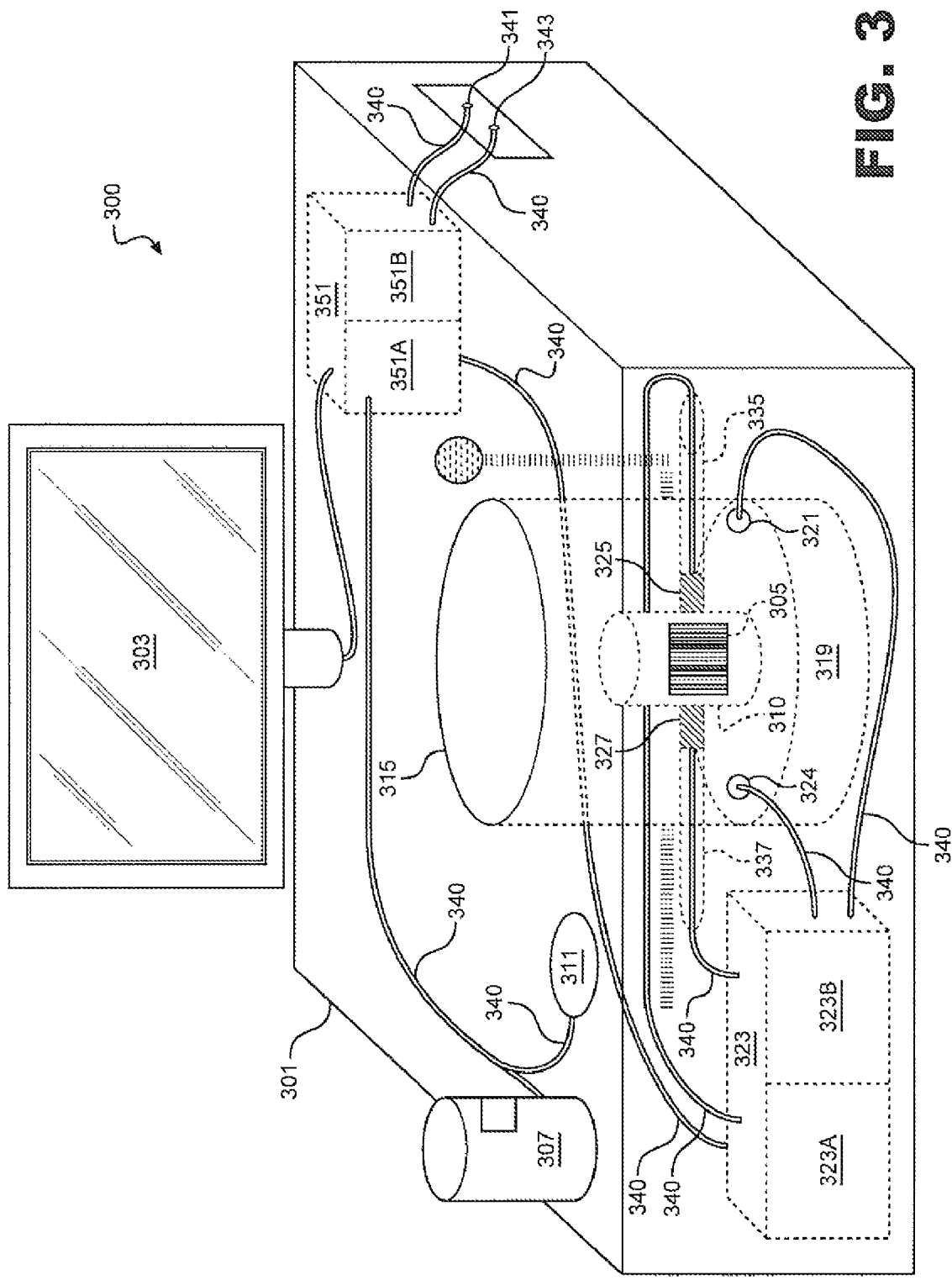
FIG. 3 is a schematic drawing that illustrates another aspect of the invention that measures three parameters of a container.

Referring now to FIG. 3, this figure illustrates a further embodiment of the invention where three parameters for of a container are measured and compared with stored data. These parameters are typically weight, electromagnetic properties, temperature, and acoustic properties. Typically the temperature of the container is also measured since the temperature of the container may vary (e.g. cold drink bottle) and thus affect the measured data. Knowledge of the temperature will allow the correction of the measured data to a norm. An infrared sensor can be used for temperature measurement. The temperature measurement is typically sent to the computer 351 for measure data correction. Optionally a physical dimension of the container can also be measured (e.g. thickness) to provide further selectivity. For example if two opposing probes are used 335, 337 as shown the space between them can be used as the measurement when the sensors 325, 327 at the end of the probes touch the container 310. Typically in this embodiment system 300 provides for the measurement of the three aforementioned parameters. System 300 includes a case 301 for holding or mounting the various parts, a monitor 303 for indicating to a checkpoint user whether the container passes or fails the test or any other selected criteria. An on off switch is 311 is used turn the system on and off. A bar code scanner 307, that is typically an omnidirectional bar code scanner scans the bar code 305. One useful barcode reader is model L59208™ from Motorola, Inc. USA.

A measurement chamber 315 is typically used for container screening. Within the measurement chamber 315 are one more radiating elements 321, 324 and one or more sensors to detect the signals radiating from the container 310. If desired one measurement may be a weighing scale that gives an initial screening for weight.

The container 310 is typically placed in the measurement chamber 315 for the tests. The chamber 315 may have an optional lid or cover (not shown) that can completely enclose the container during measurement. The latter feature assures that any electromagnetic signals remain in the measurement chamber. A typical measurement chamber 315 has a plastic/metal composite wall to contain the electromagnetic signals. A useful measurement chamber may be obtained from SRA International, Alexandria, Va. A weight scale 319 is typically in the measurement chamber 315. A typical useful scale is Model No. SP4001 from Ohaus Corporation.

Typically the apparatus comprises one or more electromagnetic antenna or elements that produce electromagnetic signals directed toward the container 310 in response to a signal from a signal generator 323A. Typical frequencies for the electromagnetic signals are 1 to 10,000 MHz. More specifically 225 to 1000 MHz. One or more electromagnetic transmitters/receptors 321 are used to test the container for dielectric constant and other electromagnetic properties. Transmitters/receptors 321 may both transmit and receive. An acoustic transducer or acoustic generator 324 may provide acoustic signals directed toward the container 310. The acoustic signals are typically ultrasonic, however, lower frequencies may also useful. One or more detectors 325 detects infrared radiation radiated from the container 310. An acoustic detector 327 may detect acoustic signals from the container 310. Spectrum analyzer 323B may be used to provide spectral analysis of a received signal from the container 310 prior to sending the analyzed signal to the computer 351. Signal generator 323A and spectrum analyzer 323b may be in one unit 323. The thermal and acoustic detectors 325, 327 may be mounted on retractable probes 335, 337 respectively. Retractable probes 335, 337 are typically moved by a manipulator 339. The manipulator 339 may be used to move or center the container 310 in the measurement chamber 315. The various electrical components are typically interconnected by electrical wires 340 as shown. Power plug 351 and information port 343 (typically Ethernet) may be used for connection to a combined computer/data storage unit 351 or separate computer 351A and data storage unit 351B. Computer 351 controls and receives data from the various components of the system 300 such as monitor 303, data storage unit 351B, spectrum analyzer 323A, signal generator 323B, data storage unit 351B, and the like as is known in the art. A combined analyzer/computer/data storage apparatus Model E8364B Vector Network Analyzer from Agilent Technologies, Inc. was used for the tests herein.

Figure 4:
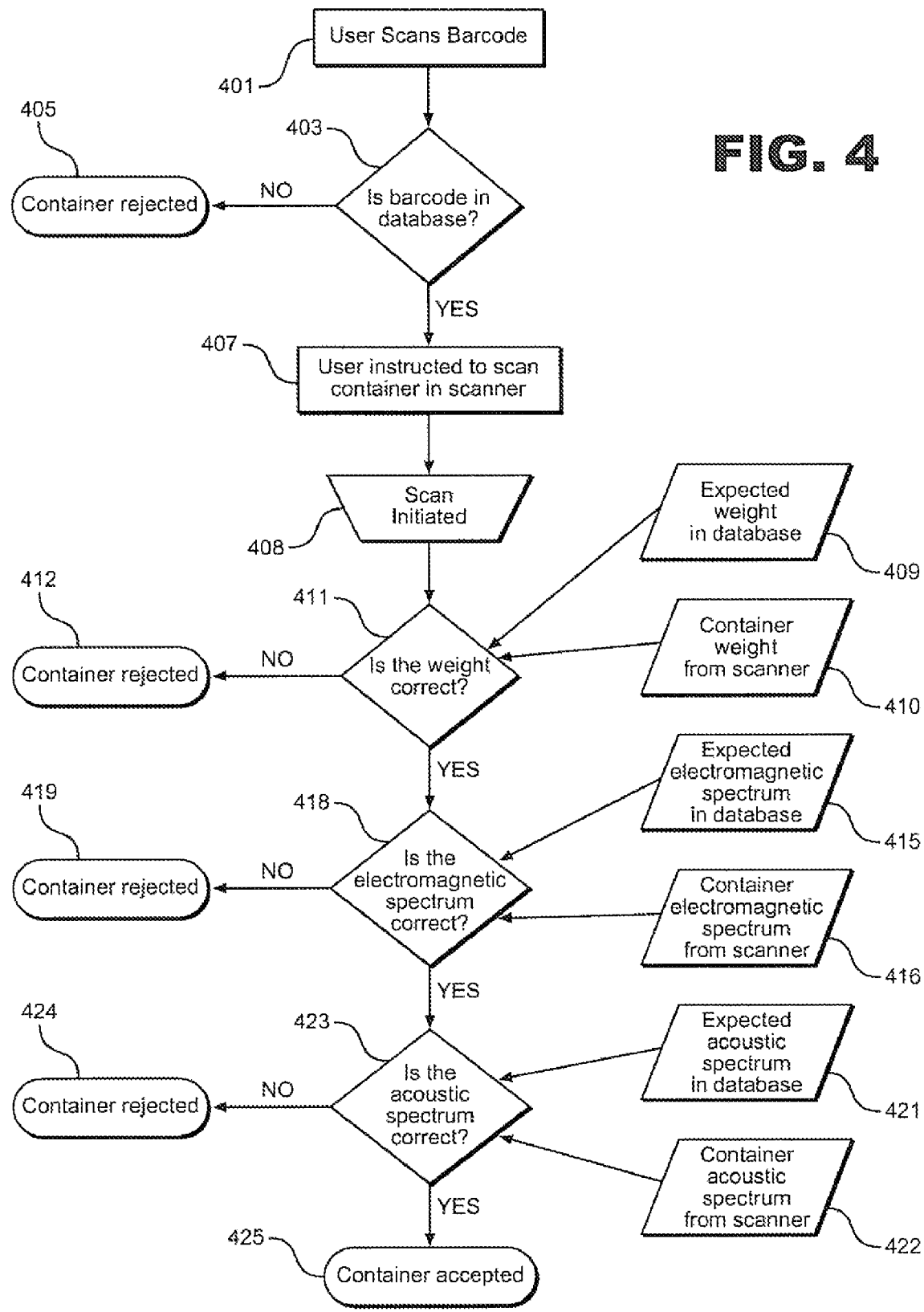
FIG. 4 is a schematic diagram illustrating steps in a typical logic flow process for determining pass or failure of a test for container screening at a security checkpoint.

Referring now to FIG. 4, the various steps typically used for a process that uses a plurality of screening methods such as weight, acoustic energy, and electromagnetic radiation or signals. A real life application for this screening would be for a container such as a bottle containing a liquid. First the user scans a bar code 305 on the container 310, step 401 and determines if the bar code is in the database 403, if no the container is rejected 405; if yes the user is instructed to test the container in the scanner. Scan is initiated 408 and the appropriate parameters of the container determined. The retrieved expected weight in the data base 409 and the measured container weight from the scanner are compared. If the weight is not correct, that is not between predetermined limits, then the container is rejected 412; if it is within the predetermined limits the electromagnetic spectrum is checked 418. The expected electromagnetic spectrum retrieved from the database 415 is then compared to the measured electromagnetic spectrum from the scanner 416 and if it is not within predetermined limits the container is rejected 419. If the electromagnetic spectrum is correct within accepted limits 418, the container is checked to see if the acoustic spectrum is correct 423. The expected acoustic spectrum retrieved from the database 421 is then compared to the measured acoustic spectrum from the scanner 422 and if it is not within predetermined limits the container is rejected 424. If the electromagnetic spectrum is correct within accepted limits 423, the container is accepted and passes the test. As is known to those skilled in the art, the order of the above tests may be other than that shown in any desired order, thus the acoustic spectrum test could be performed first followed by the other tests. The bar code scanning is preferably performed first, to facilitate the retrieval of stored data.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

I claim:

1. An apparatus for detecting container alteration comprising:
   A. a container screener comprising
      a. a UPC code scanner for scanning a UPC code on a container and providing information for the UPC code;
      b. one or more measurement units for providing one or more measured container parameters selected from the group consisting of temperature, acoustic properties and electromagnetic properties;
   B. a database containing stored container parameter data related to a plurality of UPC codes;
   C. a computer, wherein the computer
      a. retrieves the UPC code information from the scanner;
      b. retrieves stored container parameter data in the database related to the UPC code information;
      c. retrieves one or more measured parameters of the container related to the UPC code information; and
      d. determines whether the one or more measured container parameters is within a predetermined limit of the respective one or more database stored container parameters; and
      e. provides a signal of the determination; and
   D. an indicator, wherein the indicator indicates to a user whether a container passes or fails the container alteration detection.

2. The apparatus according to claim 1, further comprising two or more measurement units for measuring two or more of the following parameters selected from the group consisting of weight, temperature, acoustic properties and electromagnetic properties.

3. The apparatus according to claim 1, further comprising three measurement units and wherein the measured container parameters are weight, acoustic properties and electromagnetic properties.

4. An apparatus for screening a container comprising:
   a. a bar code scanner for scanning a bar code on the container;
   b. a measurement unit for measuring one or more of temperature, acoustic properties and electromagnetic properties associated with the container;
   c. a database for storing at least one pre-selected parameter data for the container;
   d. a computer operationally connected to the bar code scanner, measurement unit, and database, wherein the computer retrieves data from scanner, measurement unit and database and compares the pre-selected data from the measurement unit and database;
   e. an indicator operationally connected to the computer for indicating to user the result of the computer comparison.

5. The apparatus according to claim 4, comprising two or more measurement units.

6. The apparatus according to claim 5, wherein the measurement unit measures two or more of the following parameters selected from the group consisting of temperature, acoustic properties and electromagnetic properties.

7. The apparatus according to claim 4, comprising three measurement units.

8. The apparatus according to claim 7 wherein the measured parameters are weight, acoustic properties and electromagnetic properties.

9. A method for screening a container comprising:
   a. scanning a bar code on the container;
   b. measuring at least one preselected parameter associated with the container selected from the group consisting of temperature, acoustic properties and electromagnetic properties;
   c. retrieving from a database at least one stored preselected parameter for the container that is equivalent to the measured parameter for the container, and that is associated with the scanned bar code;
   d. comparing the at least one preselected parameter from the container measurement and the equivalent parameter stored in the database;
   e. indicating to a user if the comparison in step d is within selected limits.

10. The method according to claim 9, comprising two or more preselected parameters.

11. The apparatus according to claim 10, wherein the two or more preselected parameters are selected from the group consisting of weight, temperature, acoustic properties and electromagnetic properties.

12. The method according to claim 9, comprising three or more preselected parameters.

13. The method according to claim 12, wherein the preselected parameters are weight, acoustic properties and electromagnetic properties.

* * * * *